United States Patent
Zhou et al.

(10) Patent No.: US 10,063,424 B2
(45) Date of Patent: Aug. 28, 2018

(54) COMMUNICATIONS PROCESSING METHOD AND APPARATUS

(71) Applicant: Huawei Technologies Co., Ltd., Shenzhen (CN)

(72) Inventors: Junjie Zhou, Nanjing (CN); Zhiwen Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 15/172,624

(22) Filed: Jun. 3, 2016

(65) Prior Publication Data

US 2016/0285697 A1    Sep. 29, 2016

Related U.S. Application Data

(63) Continuation of application No. PCT/CN2014/090329, filed on Nov. 5, 2014.

(30) Foreign Application Priority Data

Dec. 6, 2013 (CN) .......................... 2013 1 0656799

(51) Int. Cl.
*G06F 15/16* (2006.01)
*H04L 12/24* (2006.01)
*H04L 29/08* (2006.01)
*G06F 9/445* (2018.01)
*G06F 8/30* (2018.01)
(Continued)

(52) U.S. Cl.
CPC ................ *H04L 41/12* (2013.01); *G06F 8/31* (2013.01); *G06F 9/44505* (2013.01); *G06F 9/44521* (2013.01); *G06Q 10/06* (2013.01); *H04L 29/08072* (2013.01); *H04L 41/22* (2013.01); *G06F 2209/5015* (2013.01); *H04L 29/06* (2013.01)

(58) Field of Classification Search
CPC .......................... H04L 29/08072; H04L 29/06
USPC .................. 709/203, 220, 224, 228; 370/466
See application file for complete search history.

(56) References Cited

U.S. PATENT DOCUMENTS 9,303,169 B2 * 4/2016 Herdman ................. C09D 5/14
9,497,114 B2 * 11/2016 Zaifman ............... H04L 63/306
(Continued)

FOREIGN PATENT DOCUMENTS

CN      101132401 A      2/2008
CN      102291464 A     12/2011
(Continued)

*Primary Examiner* — Khanh Dinh
(74) *Attorney, Agent, or Firm* — Slater Matsil, LLP

(57) ABSTRACT

A communications processing method includes: receiving, by a service node, service data sent by an upstream service node; establishing at least one egress branch according to the service data and a process variable that is of the service node and corresponds to the service data, where the process variable is used to indicate an attribute of a downstream service node; outputting, by the service node, the at least one egress branch to a display page; and determining, by the service node, the egress branch according to the received trigger instruction, and outputting the service data by using the egress branch. Efficiency of an online process adjustment of service processing can be improved, thereby improving flexibility of the entire service processing.

11 Claims, 6 Drawing Sheets

(51) Int. Cl.
*G06Q 10/06* (2012.01)
*H04L 29/06* (2006.01)

(56) References Cited

U.S. PATENT DOCUMENTS

| | | | |
|---|---|---|---|
| 9,654,386 B2* | 5/2017 | Torvi | H04L 45/28 |
| 2003/0043821 A1* | 3/2003 | Van Den Bosch | H04L 41/00 |
| | | | 370/400 |
| 2004/0095922 A1* | 5/2004 | Sasagawa | H04L 45/00 |
| | | | 370/351 |
| 2012/0066018 A1 | 3/2012 | Piersol | |
| 2013/0022041 A1* | 1/2013 | Kini | H04L 12/66 |
| | | | 370/389 |
| 2015/0131653 A1* | 5/2015 | Zaifman | H04L 45/507 |
| | | | 370/389 |
| 2016/0254922 A1* | 9/2016 | Folkmanis | G06F 1/14 |
| | | | 700/275 |
| 2016/0285697 A1 | 9/2016 | Zhou et al. | |

FOREIGN PATENT DOCUMENTS

| | | |
|---|---|---|
| CN | 102456173 A | 5/2012 |
| CN | 102810070 A | 12/2012 |
| CN | 103677913 A | 3/2014 |
| EP | 2466809 B1 | 5/2013 |

\* cited by examiner

COMMUNICATIONS PROCESSING METHOD AND APPARATUS

This application is a continuation of International Application No. PCT/CN2014/090329, filed on Nov. 5, 2014, which claims priority to Chinese Patent Application No. 201310656799.5, filed on Dec. 6, 2013, both of which are hereby incorporated by reference in their entireties.

TECHNICAL FIELD

Embodiments of the present application relate to the field of communications technologies, and in particular, to a communications processing method and apparatus.

BACKGROUND

With development of computer communications technologies, many industries such as finance, telecommunications, and transportation start to control and process business processes of respective industries by using the computer communications technologies. Currently, middleware related to business process management (BPM) is generally constituted by a integrated development environment (IDE), a BPM engine, and a technical framework platform. The BPM is mainly responsible for embedding modeling of a business process into a service system, and helps an upper-level service complete orchestration deployment and operation scheduling of a process in a manner of providing the service with process modeling and an engine process instance scheduling application programming interface (API), in order to create various processes that satisfy service development for users in the industries. The IDE is responsible for modeling of a business process. The BPM engine is responsible for driving a business process. The technical framework platform is used to store public platforms of development systems, and these public platforms are platforms in which corresponding technologies have already been defined.

In the prior art, a transfer relationship among each upstream service node, current service node and downstream service node has already been fixedly set during IDE modeling. In a process of service processing, once an original path for transmission of service data needs to be changed, for example, an egress needs to be added, and the service data is not transmitted to a configured downstream service node, but needs to be transmitted to a downstream service node corresponding to the newly-added egress, original business process code needs to be modified in the IDE, and the BPM needs to packetize and redeploy an entire business process, and restart the entire business process, in order to add the new downstream service node for the current service node, and transmit the service data to the new downstream service node. In this technology, an online adjustment of the business process takes effect only after the code is modified and the business process is restarted, which causes low efficiency of a BPM online process adjustment, and restricts flexibility of the entire business process.

SUMMARY

Embodiments of the present application provide a communications processing method and apparatus, which can improve efficiency of an online process adjustment of service processing, thereby improving flexibility of the entire service processing.

According to a first aspect, an embodiment of the present application provides a business process management BPM-based service processing method, and the method includes: receiving, by a service node, service data sent by an upstream service node; establishing, by the service node, at least one egress branch according to the service data and a process variable that is of the service node and corresponds to the service data, where the process variable is used to indicate an attribute of a downstream service node; outputting, by the service node, the at least one egress branch to a display page, so that a user selects an egress branch on the display page and initiates a trigger instruction on the display page; and determining, by the service node, the egress branch according to the received trigger instruction, and outputting the service data by using the egress branch.

In a first possible implementation manner, according to the first aspect, the establishing, by the service node, at least one egress branch according to the service data and a process variable that is of the service node and corresponds to the service data includes: determining, by the service node, a required processing rule according to a service attribute of the service data, where each processing rule corresponds to a unique process variable of the processing rule; selecting, by the service node, a process variable that matches the processing rule from preset process variables, where the preset process variables are generated for the service node during modeling; and establishing, by the service node, the at least one egress branch according to the process variable.

In a second possible implementation manner, with reference to the first aspect and the first possible implementation manner, the outputting, by the service node, the at least one egress branch to a display page includes: generating, by the service node, a triggerable label for each egress branch that needs to be triggered and corresponds to the process variable, in order to generate, on the display page, a trigger key corresponding to each triggerable label.

In a third possible implementation manner, according to the second possible implementation manner, the generating, by the service node, a triggerable label for each egress branch that needs to be triggered and corresponds to the process variable, in order to generate, on the display page, a trigger key corresponding to each triggerable label includes: generating, by the service node, the triggerable label according to each egress branch that needs to be triggered and corresponds to the process variable, in order to use a technical framework platform to generate, on the display page, the trigger key corresponding to each triggerable label, where the triggerable label is provided with a name of the corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label.

In a fourth possible implementation manner, with reference to the first aspect, the first possible implementation manner, the second possible implementation manner, and the third possible implementation manner, after the outputting the service data by using the egress branch, the method further includes: deleting, by the service node, all established egress branches by using an IDE.

In a fifth possible implementation manner, with reference to the first aspect, the first possible implementation manner, the second possible implementation manner, and the third possible implementation manner, after the outputting the service data by using the egress branch, the method further includes: receiving, by the service node, next service data sent by the upstream service node; and updating, by the service node by using an IDE, the established egress branch according to the next service data and a process variable that is of the service node and corresponds to the next service data.

In a sixth possible implementation manner, according to the fifth possible implementation, the updating, by the service node by using the IDE, the established egress branch according to the next service data and a process variable that is of the service node and corresponds to the next service data includes: determining, by the service node, that an egress branch that is in the established egress branch and corresponds to the process variable that is of the service node and corresponds to the next service data is unchanged; deleting, by the service node by using the IDE, an egress branch that is in the established egress branch and does not correspond to the process variable that is of the service node and corresponds to the next service data; and establishing, by the service node by using the IDE, an egress branch except the unchanged egress branch according to the next service data and the process variable that is of the service node and corresponds to the next service data.

According to a second aspect, an embodiment of the present application provides a business process management BPM-based service processing apparatus, and the apparatus includes: a receiving unit, configured to receive service data sent by an upstream service node; an establishment unit, configured to establish at least one egress branch according to the service data and a process variable that is of the service node and corresponds to the service data, where the process variable is used to indicate an attribute of a downstream service node; and a processing unit, configured to output the at least one egress branch to a display page, so that a user selects an egress branch on the display page and initiates a trigger instruction on the display page, where the processing unit is further configured to determine the egress branch according to the received trigger instruction, so that a sending unit outputs the service data by using the egress branch.

In a first possible implementation manner, according to the second aspect, the establishment unit is specifically configured to determine a required processing rule according to a service attribute of the service data, where each processing rule corresponds to a unique process variable of the processing rule; select a process variable that matches the processing rule from preset process variables, where in the preset process variables are generated for the service node during modeling; and establish the at least one egress branch according to the process variable.

In a second possible implementation manner, with reference to the second aspect and the first possible implementation manner, the processing unit is specifically configured to generate a triggerable label for each egress branch that needs to be triggered and corresponds to the process variable, in order to generate, on the display page, a trigger key corresponding to each triggerable label.

In a third possible implementation manner, according to the second possible implementation manner, the processing unit is specifically configured to generate the triggerable label according to each egress branch that needs to be triggered and corresponds to the process variable, in order to use a technical framework platform to generate, on the display page, the trigger key corresponding to each triggerable label, where the triggerable label is provided with a name of the corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label.

In a fourth possible implementation manner, with reference to the second aspect, the first possible implementation manner, the second possible implementation manner, and the third possible implementation manner, the apparatus further includes: a deletion unit, configured to delete all established egress branches by using the IDE.

In a fifth possible implementation manner, with reference to the second aspect, the first possible implementation manner, the second possible implementation manner, and the third possible implementation manner, the receiving unit is further configured to receive next service data sent by the upstream service node; and the processing unit is further configured to update, by using the IDE, the established egress branch according to the next service data and a process variable that is of the service node and corresponds to the next service data.

In a sixth possible implementation manner, according to the fifth possible implementation manner, the processing unit is specifically configured to determine that an egress branch that is in the established egress branch and corresponds to the process variable that is of the service node and corresponds to the next service data is unchanged, so that the deletion unit deletes, by using the IDE, an egress branch that is in the established egress branch and does not correspond to the process variable that is of the service node and corresponds to the next service data, and the establishment unit establishes, by using the IDE, an egress branch except the unchanged egress branch according to the next service data and the process variable that is of the service node and corresponds to the next service data.

According to the BPM-based service processing method and apparatus that are provided in the embodiments of the present application, a service node receives service data sent by an upstream service node; establishes at least one egress branch according to the service data and a process variable that is of the service node and corresponds to the service data, where the process variable is used to indicate an attribute of a downstream service node; displays the at least one egress branch, so that a user selects an egress branch on a display page and initiates a trigger instruction on the display page; and determines the egress branch according to the received trigger instruction, and outputs the service data by using the egress branch. In this way, the service node can dynamically generate an egress branch when service data arrives, and no longer needs to recode and restart a set egress branch to implement an increase or a decrease of the egress branch. Therefore, the service node can provide in real time the received data with a required egress branch, thereby improving efficiency of an online process adjustment of service processing, and improving flexibility of the entire service processing.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1:
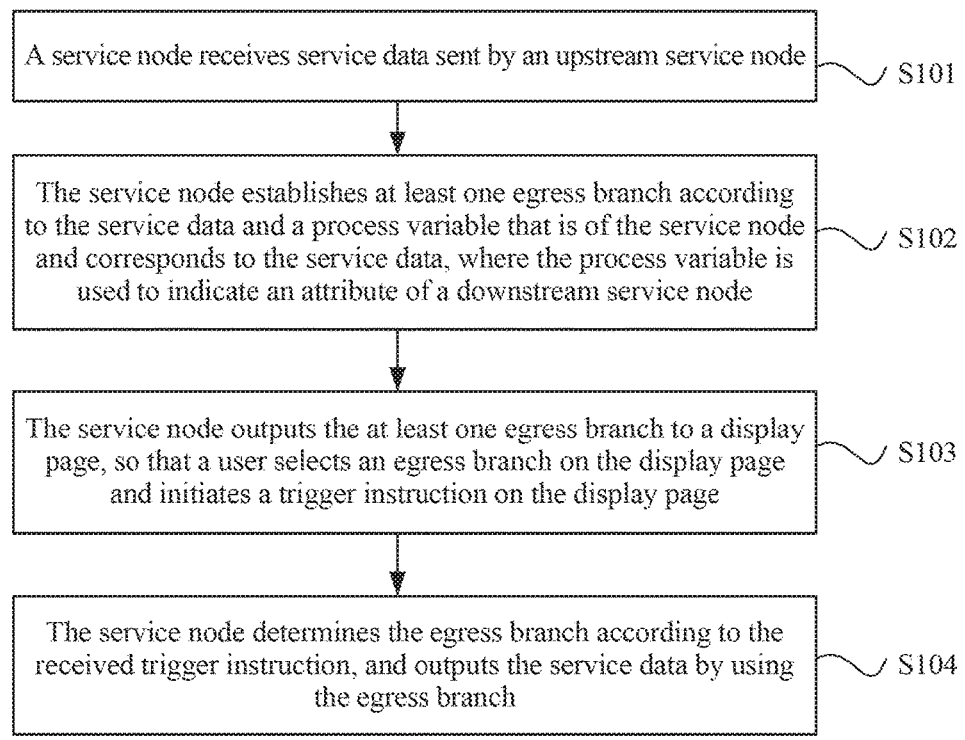
FIG. 1 is a flowchart of a BPM-based service processing method according to an embodiment of the present application.

FIG. 1 is a flowchart of a BPM-based service processing method according to an embodiment of the present application. As shown in FIG. 1, the method includes:

S101. A service node receives service data sent by an upstream service node.

For example, the service node may be an intermediate node in service processing, and is configured to process or allocate the received service data. For example, the service data is a dispatch of a human task. When receiving the dispatch of the human task, the service node may learn, by parsing, that the dispatch of the human task is a manual dispatch or an automatic dispatch, and performs different processing on different dispatches. For example, the service node directly approves the manual dispatch, and determines an automatic processing process for the automatic dispatch according to a core attribute of the automatic dispatch. The upstream service node is a service node that sends service data to the service node.

S102. The service node establishes at least one egress branch according to the service data and a process variable that is of the service node and corresponds to the service data, where the process variable is used to indicate an attribute of a downstream service node.

It should be noted that, that the service node establishes at least one egress branch according to the service data and a process variable that is of the service node and corresponds to the service data mainly indicates that the service node has already determined, during modeling, all downstream service nodes to which the service data can be output. Because different service data needs to correspond to different processing rules such as "modify", "reject", or "approve", and establishing egress branches for all the downstream service nodes to which the service data can be output causes a large amount of redundancy, the service node may need to establish an egress branch for the service data corresponding to the processing rules such as "modify" or "reject". Because each egress branch is established according to one process variable, each egress branch may be bound with the process variable.

Further, the process variable is an identity (ID) of a neighboring service node of the service node or a name of the neighboring service node, where the neighboring service node includes an upstream service node and an downstream service node of the service node, and generally refers to the downstream service node. For example, the process variable determines the attribute of the downstream service node according to an ID or a name of the downstream service node and indicates the attribute of the downstream service node, and the process variable may be defined as a Next Transition ID, a Next Transition name, or the like.

It should be noted that, the service node may establish, by using an integrated development environment (IDE), the at least one egress branch according to the service data and the process variable that is of the service node and corresponds to the service data. The IDE is application software that can assist in program development.

S103. The service node outputs the at least one egress branch to a display page, so that a user selects an egress branch on the display page and initiates a trigger instruction on the display page.

For example, the service node may select a part, that needs to be displayed, of the foregoing established egress branch for display on a form page, or may display all established egress branches on a form page. Preferably, the service node may display, on the form page, an egress branch that needs to be triggered by using the trigger instruction.

Further, the form page may use a server-end page technology, such as User Show Layer (USL), Java server pages (JSP), and a hypertext preprocessor (PHP), and dynamically generates a form button according to the foregoing egress branch, where the button may provide the user with a choice, for example, the button may carry a word such as "reject" or "modify". Certainly, the button may be dynamically triggered, so that the user selects the egress branch and initiates the trigger instruction. For example, the user selects "reject", and then can double-click or tap "reject". In this way, the "reject" button becomes a button selected by the user. In this case, the trigger instruction of the user is dedicated for an egress branch corresponding to the "reject" button.

S104. The service node determines the egress branch according to the received trigger instruction, and outputs the service data by using the egress branch.

For example, it is determined, according to a trigger instruction of "modify", that the egress branch is a downstream service node A corresponding to "modify" processing, and then the service data is output by using the egress branch that leads to the downstream service node A, so that the service data arrives at the downstream service node A. Alternatively, it is determined, according to a trigger instruction of "reject", that the egress branch is an upstream service node B corresponding to "reject" processing, and then the service data is output by using the egress branch that leads to the upstream service node B.

Further, the service node determines the egress branch according to the received trigger instruction, and invokes the determined egress branch by using a BPM engine, in order to output the service data by using the egress branch.

Still further, according to the received trigger instruction, the service node determines one egress branch, or may determine multiple egress branches, that is, multi-processing needs to be simultaneously performed on the service data.

According to the BPM-based service processing method provided in this embodiment of the present application, a service node receives service data sent by an upstream service node; establishes at least one egress branch according to the service data and a process variable that is of the service node and corresponds to the service data, where the process variable is used to indicate an attribute of a downstream service node; displays the at least one egress branch, so that a user selects an egress branch on a display page and initiates a trigger instruction on the display page; and determines the egress branch according to the received trigger instruction, and outputs the service data by using the egress branch. In this way, the service node can dynamically generate an egress branch when service data arrives, and no longer needs to recode and restart a set egress branch to implement an increase or a decrease of the egress branch. Therefore, the service node can provide in real time the received data with a required egress branch, thereby improving efficiency of an online process adjustment of service processing, and improving flexibility of the entire service processing.

Figure 2:
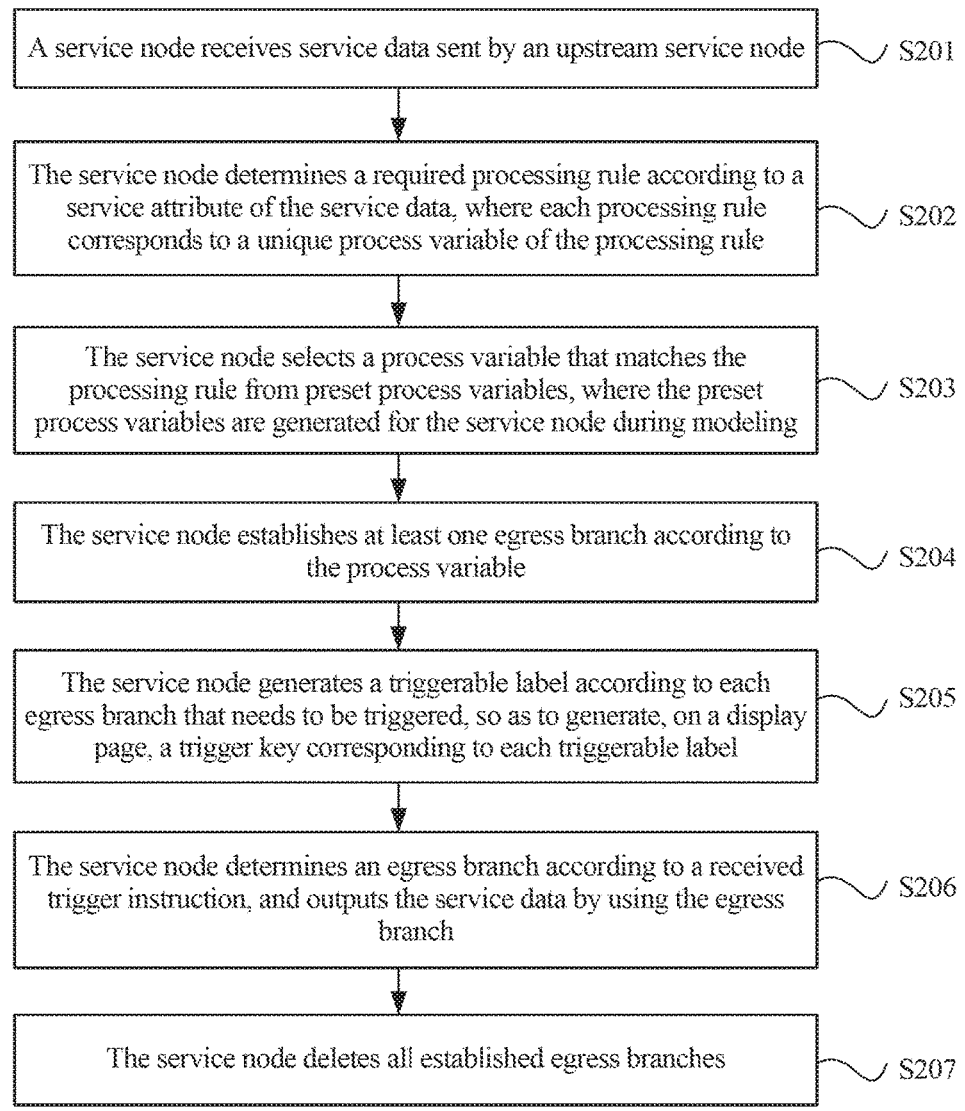
FIG. 2 is a flowchart of an embodiment of another BPM-based service processing method according to an embodiment of the present application.

FIG. 2 is a flowchart of an embodiment of another BPM-based service processing method according to an embodiment of the present application. As shown in FIG. 2, the method includes:

S201. A service node receives service data sent by an upstream service node.

S202. The service node determines a required processing rule according to a service attribute of the service data, where each processing rule corresponds to a unique process variable of the processing rule.

It should be noted that, each processing rule uniquely corresponds to one process variable.

For example, the service data is a dispatch of a human task, and it is determined, according to this service attribute, that a processing rule of the dispatch of the human task may be "discard", "modify", "reject", or "approve". Each processing rule may correspond to one process variable, and the process variable may be an ID of a neighboring service node. For example, "discard" corresponds to a neighboring service node in, "modify" corresponds to a neighboring service node 112, "reject" corresponds to a neighboring upstream service node no, and "approve" corresponds to a neighboring downstream service node 114, which are described only as examples herein and shall not constitute any limitation.

S203. The service node selects a process variable that matches the processing rule from preset process variables, where the preset process variables are generated for the service node during modeling.

For example, processing rules corresponding to the preset process variables generated for the service node during modeling include: "discard", "modify", "reject", "approve", "calculate by superposition", "encrypt", and the like. If processing rules required by the service data are only "discard", "modify", "reject" and "approve", the service node selects only the neighboring service node in corresponding to "discard", the neighboring service node 112 corresponding to "modify", the neighboring upstream service node no corresponding to "reject", and the neighboring downstream service node 114 corresponding to "approve", and does not select a neighboring service node 115 corresponding to "calculate by superposition" and a neighboring downstream service node 117 corresponding to "encrypt".

S204. The service node establishes at least one egress branch according to the process variable.

For example, the service node may establish an egress branch to another corresponding service node according to an ID of each selected service node, for example, the service node establishes egress branches to the service node in, the service node 112, the service node no, and the service node 114.

S205. The service node generates a triggerable label for each egress branch that needs to be triggered, in order to generate, on a display page, a trigger key corresponding to each triggerable label.

For example, because the dispatch of the human task falls into two categories: a manual dispatch and an automatic dispatch, it may be easily figured out that, for the automatic dispatch may also be directly completed without triggering a service, the service node may generate or may not generate a triggerable label for the automatic dispatch. That is, the service node generates a triggerable label for each egress branch corresponding to the process variable. Alternatively, the service node generates a triggerable label for each egress branch that needs to be triggered and corresponds to the process variable. Still alternatively, a same triggerable label may be generated for all egress branches corresponding to the process variable of the automatic dispatch. For example, a display type of the triggerable label is a button, and is subject to a quantity of egress branches that require manual dispatches, in other words, a total quantity of generated buttons=public operations (such as sleep, delete, or terminate) in an entire process, +a quantity of process variables that may have manual dispatches+1, where 1 indicates a label that does not need to be triggered, which is described only as an example herein and shall not be construed as any limitation.

Further, the service node generates the triggerable label according to each egress branch that may need to be triggered, in order to use a technical framework platform to generate, on the display page, the trigger key corresponding to each triggerable label.

For example, the triggerable label is provided with a name of a corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label.

Further, when a display type of the triggerable label is the foregoing button, the button may be written with a word such as button "1" or "2" as a name, and displays service content such as "discard", "modify", "reject" or "approve", and may further be identified with whether triggering is needed, for example, "discard" does not need to be triggered, and "reject" needs to be triggered.

For example, buttons on a dispatch page of the human task may be all implemented by using a usl template:

```
<bme:template templatefile="/usl/template/processButton.usl" >
<c:set var="taskId" value="${param.taskId}" scope="request" />
</bme:template>.
```

In addition, the buttons on the dispatch page of the human task are automatically generated by using the foregoing template.

S206. The service node determines an egress branch according to a received trigger instruction, and outputs the service data by using the egress branch.

For example, the service node determines the egress branch according to the received trigger instruction, and invokes the determined egress branch by using a BPM engine, in order to output the service data by using the egress branch, which, for example, is implemented by using a BPM engine process instance scheduling API (application programming interface), which may be specifically that the BPM engine provides a query API, with input being an identifier that is of a current service node and is bound with an operation form, such as an ID of the current service node, and with a return value being connection line objects of all egress branches that are selected by the current service node and correspond to the foregoing buttons, namely, neighboring service nodes. A program may be written as the following:

API List<Transition Definition>get Next Step Task Transitions (String current Act DefId)

The service node may establish the foregoing egress branch by using an IDE. The egress branch may be defined as "transition", which is also referred to as a branch transfer. In this embodiment of the present application, some extended attributes may be added to a defined transition function in BPM, which are used to store data of a label of the foregoing form, for example, a name of a button, and a value that is of a process variable and is transferred to the BPM, such as 111 or 114, whether the foregoing label needs to be triggered, namely, whether the label is a manual dispatch, and the like.

S207. The service node deletes all established egress branches.

Further, the service node deletes all the established egress branches by using the IDE. In this way, when next service data arrives, the service data may also establish at least one egress branch according to the next service data and a process variable that is of the service node and corresponds to the next service data.

Figure 3:
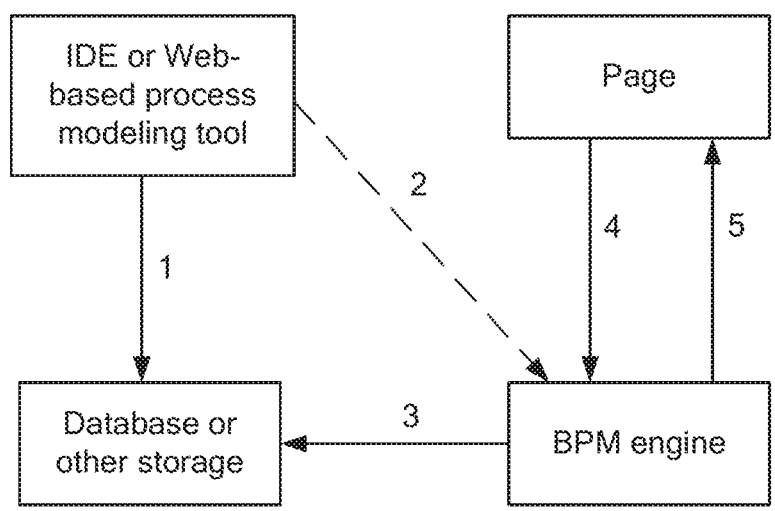
FIG. 3 is a schematic diagram of a BPM architecture that modifies online a process definition.

It should be noted that, FIG. 3 is a schematic diagram of a BPM architecture that modifies online a process definition. As shown in FIG. 3, 1 is that the IDE or a Web Composer (Web-based process modeling tool) adjusts online a process definition, and 1 is responsible for completing step S202 and step S204. 2 is that the IDE or the Web Composer instructs the engine to invoke data from a database or other storage, and 3 is that the engine invokes a preset process variable from the database or the other storage, and 2 and 3 are responsible for completing step S203 and step S204. 4 and 5 are that the BPM engine interacts with a page, and 4 and 5 are responsible for completing step S205 and step S206.

According to the BPM-based service processing method provided in this embodiment of the present application, a service node receives service data sent by an upstream service node; establishes at least one egress branch according to the service data and a process variable that is of the service node and corresponds to the service data, where the process variable is used to indicate an attribute of a downstream service node; displays the at least one egress branch, so that a user selects an egress branch on a display page and initiates a trigger instruction on the display page; and determines the egress branch according to the received trigger instruction, and outputs the service data by using the egress branch. In this way, the service node can dynamically generate an egress branch when service data arrives, and no longer needs to recode and restart a set egress branch to implement an increase or a decrease of the egress branch. Therefore, the service node can provide in real time the received data with a required egress branch, thereby improving efficiency of an online process adjustment of service processing, and improving flexibility of the entire service processing.

Figure 4:
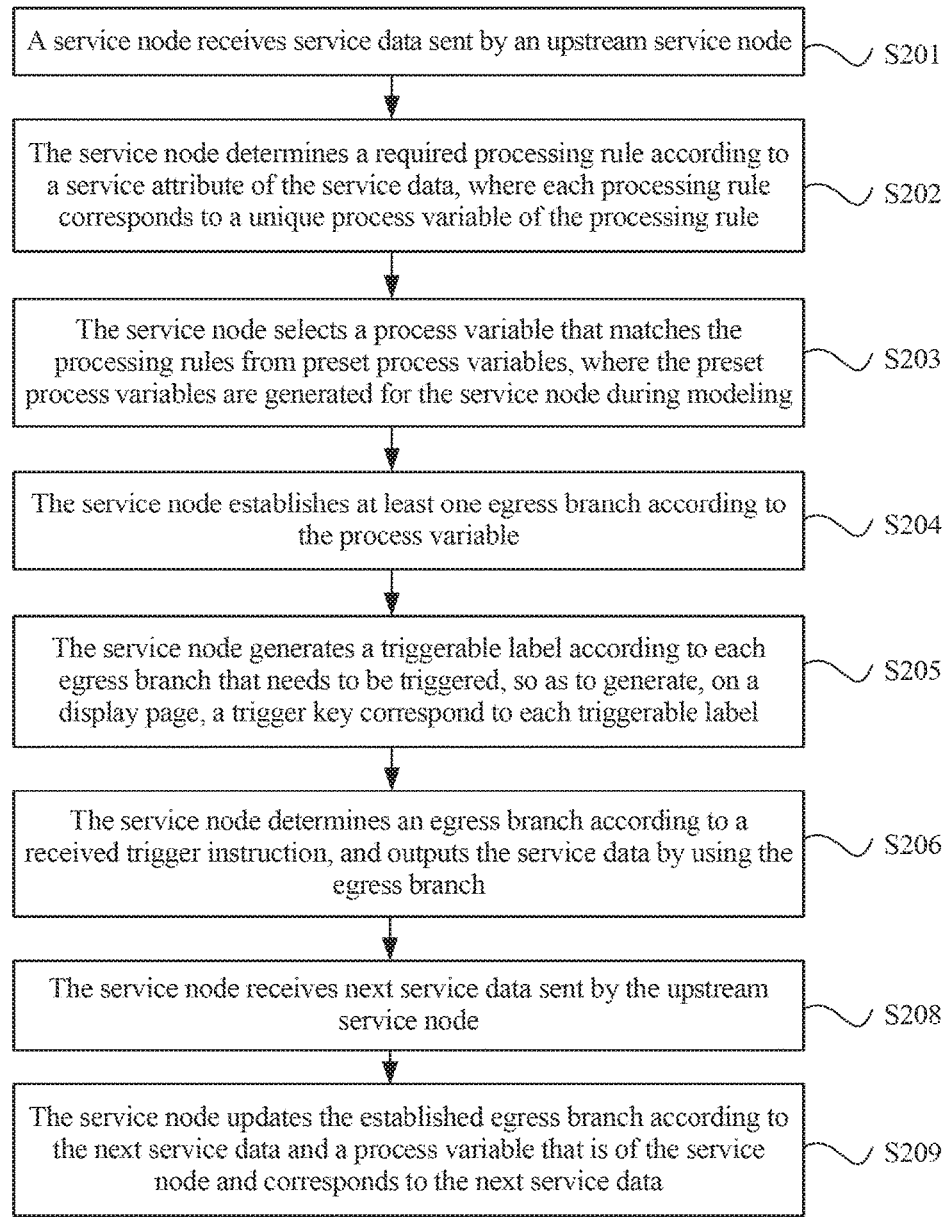
FIG. 4 is a flowchart of an embodiment of another BPM-based service processing method according to an embodiment of the present application.

FIG. 4 is a flowchart of an embodiment of another BPM-based service processing method according to an embodiment of the present application. As shown in FIG. 4, on a basis of S201-S206 in the foregoing embodiment, after S206, the method may further include:

S208. The service node receives next service data sent by the upstream service node.

It should be noted that, the service node may not clear the established egress branch after sending the service data, but update the egress branch according to the next service data. This embodiment is applied to this scenario, which shall not be construed as any limitation.

S209. The service node updates the established egress branch according to the next service data and a process variable that is of the service node and corresponds to the next service data.

For example, the service node determines that an egress branch that is in the established egress branch and corresponds to the process variable that is of the service node and corresponds to the next service data is unchanged. The service node deletes an egress branch that is in the established egress branch and does not correspond to the process variable that is of the service node and corresponds to the next service data. The service node establishes an egress branch except the unchanged egress branch according to the next service data and the process variable that is of the service node and corresponds to the next service data.

For example, the processing rules corresponding to the preset process variables generated for the service node during modeling include: "discard", "modify", "reject", "approve", "calculate by superposition", "encrypt", and the like. The service node has established egress branches corresponding to the following processing rules: "discard", "modify", "reject", and "approve". Processing rules corresponding to a process variable requested by the newly-received service data, specifically, the next service data, are "approve" and "calculate by superposition". Then, the service node reserves an egress branch of "approve" corresponding to, establishes a new egress branch of "calculate by superposition", and deletes egress branches of "discard", "modify" or "reject" corresponding to.

Further, the service node updates, by using the IDE, the established egress branch according to the next service data and the process variable that is of the service node and corresponds to the next service data.

According to the BPM-based service processing method provided in this embodiment of the present application, a service node receives service data sent by an upstream service node; establishes at least one egress branch according to the service data and a process variable that is of the service node and corresponds to the service data, where the process variable is used to indicate an attribute of a downstream service node; displays the at least one egress branch, so that a user selects an egress branch on a display page and initiates a trigger instruction on the display page; and determines the egress branch according to the received trigger instruction, and outputs the service data by using the egress branch. In this way, the service node can dynamically generate an egress branch when service data arrives, and no longer needs to recode and restart a set egress branch to implement an increase or a decrease of the egress branch. Therefore, the service node can provide in real time the received data with a required egress branch, thereby improving efficiency of an online process adjustment of service processing, and improving flexibility of the entire service processing.

Figure 5:
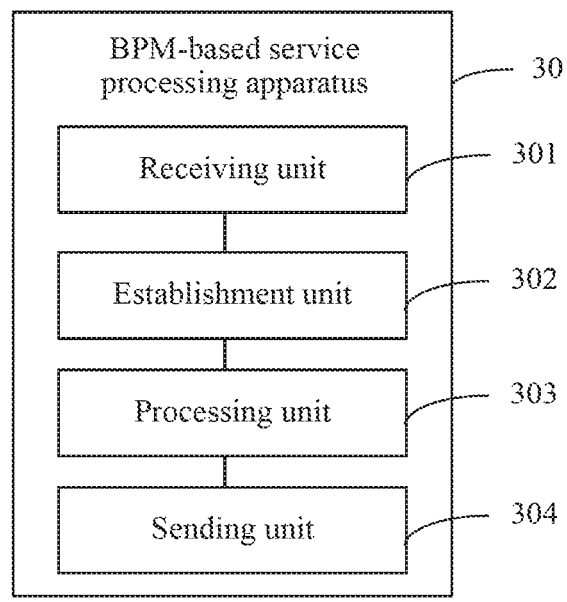
FIG. 5 is a schematic structural diagram of a BPM-based service processing apparatus according to an embodiment of the present application.

FIG. 5 is a schematic structural diagram of a BPM-based service processing apparatus according to an embodiment of the present application. As shown in FIG. 5, a BPM-based service processing apparatus 30 includes:

a receiving unit 301, configured to receive service data sent by an upstream service node;

an establishment unit 302, configured to establish at least one egress branch according to the service data and a process variable that is of a service node and corresponds to the service data, where the process variable is used to indicate an attribute of a downstream service node; and a processing unit 303, configured to output the at least one egress branch to a display page, so that a user selects an egress branch on the display page and initiates a trigger instruction on the display page, where the processing unit 303 is further configured to determine the egress branch according to the received trigger instruction, so that a sending unit 304 outputs the service data by using the egress branch.

Further, the establishment unit 302 is specifically configured to establish, by using an IDE, the at least one egress branch according to the service data and the process variable that is of the service node and corresponds to the service data.

The processing unit 303 is specifically configured to determine the egress branch according to the received trigger instruction, and invoke the determined egress branch by using a BPM engine, so that the sending unit 304 outputs the service data by using the egress branch.

For example, the establishment unit 302 is specifically configured to determine a required processing rule according to a service attribute of the service data, where each processing rule corresponds to a unique process variable of the processing rule; select a process variable that matches the processing rule from preset process variables, where the preset process variables are generated for the service node during modeling; and establish the at least one egress branch according to the process variable.

The processing unit 303 is specifically configured to generate a triggerable label for each egress branch that needs to be triggered and corresponds to the process variable, in order to generate, on the display page, a trigger key corresponding to each triggerable label.

Further, the processing unit 303 is specifically configured to generate the triggerable label according to each egress branch that needs to be triggered and corresponds to the process variable, in order to use a technical framework platform to generate, on the display page, the trigger key corresponding to each triggerable label, where the triggerable label is provided with a name of the corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label.

Still further, the receiving unit 301 is further configured to receive next service data sent by the upstream service node; and The processing unit 303 is further configured to update, by using the IDE, the established egress branch according to the next service data and a process variable that is of the service node and corresponds to the next service data.

For example, the processing unit 303 is specifically configured to determine that an egress branch that is in the established egress branch and corresponds to the process variable that is of the service node and corresponds to the next service data is unchanged, so that a deletion unit deletes, by using the IDE, an egress branch that is in the established egress branch and does not correspond to the process variable that is of the service node and corresponds to the next service data, and the establishment unit establishes, by using the IDE, an egress branch except the unchanged egress branch according to the next service data and the process variable that is of the service node and corresponds to the next service data.

Figure 6:
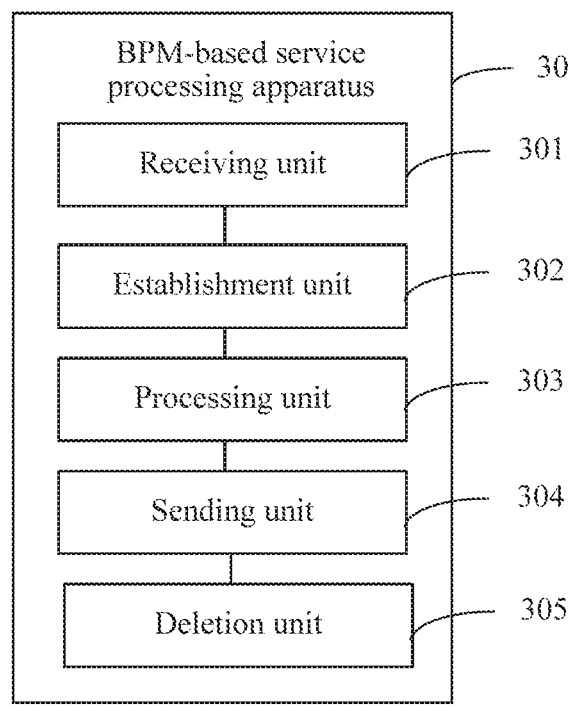
FIG. 6 is a schematic structural diagram of another BPM-based service processing apparatus according to an embodiment of the present application.

Further, FIG. 6 is a schematic structural diagram of another BPM-based service processing apparatus according to an embodiment of the present application. As shown in FIG. 6, on the basis of a structure of the apparatus shown in FIG. 5, the BPM-based service processing apparatus in this embodiment may further include:

a deletion unit 305, configured to delete all established egress branches.

For example, the deletion unit 305 is specifically configured to delete all established egress branches by using the IDE.

The BPM-based service processing apparatus 30 in this embodiment may be configured to execute technical solutions in any method embodiment shown in FIG. 1 to FIG. 4, and implementation principles and technical effects thereof are similar, and details are not described herein again.

According to the BPM-based service processing apparatus provided in this embodiment of the present application, a service node receives service data sent by an upstream service node; establishes at least one egress branch according to the service data and a process variable that is of the service node and corresponds to the service data, where the process variable is used to indicate an attribute of a downstream service node; displays the at least one egress branch, so that a user selects an egress branch on a display page and initiates a trigger instruction on the display page; and determines the egress branch according to the received trigger instruction, and outputs the service data by using the egress branch. In this way, the service node can dynamically generate an egress branch when service data arrives, and no longer needs to recode and restart a set egress branch to implement an increase or a decrease of the egress branch. Therefore, the service node can provide in real time the received data with a required egress branch, thereby improving efficiency of an online process adjustment of service processing, and improving flexibility of the entire service processing.

Figure 7:
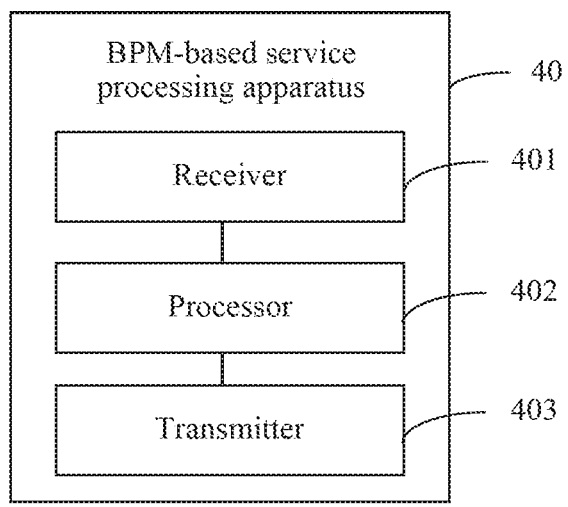
FIG. 7 is a schematic structural diagram of a BPM-based service processing apparatus according to another embodiment of the present application.

FIG. 7 is a schematic structural diagram of a BPM-based service processing apparatus according to another embodiment of the present application. As shown in FIG. 7, a BPM-based service processing apparatus 40 includes:

a receiver 401, configured to receive service data sent by an upstream service node; and a processor 402, configured to establish at least one egress branch according to the service data and a process variable that is of a service node and corresponds to the service data, where the process variable is used to indicate an attribute of a downstream service node, where the processor 402 is configured to output the at least one egress branch to a display page, so that a user selects an egress branch on the display page and initiates a trigger instruction on the display page; and the processor 402 is further configured to determine the egress branch according to the received trigger instruction, so that a transmitter 403 outputs the service data by using the egress branch.

Further, the processor 402 is specifically configured to establish, by using an IDE, the at least one egress branch according to the service data and the process variable that is of the service node and corresponds to the service data; and the processor 402 is specifically configured to determine the egress branch according to the received trigger instruction, and invoke the determined egress branch by using a BPM engine, so that the transmitter 403 outputs the service data by using the egress branch.

For example, the processor 402 is specifically configured to determine a required processing rule according to a service attribute of the service data, where each processing rule corresponds to a unique process variable of the processing rule; select a process variable that matches the processing rule from preset process variables, where the preset process variables are generated for the service node during modeling; establish the at least one egress branch according to the process variable.

The processor 402 is specifically configured to generate a triggerable label for each egress branch that needs to be triggered and corresponds to the process variable, in order to generate, on the display page, a trigger key corresponding to each triggerable label.

Further, the processor 402 is specifically configured to generate the triggerable label according to each egress branch that needs to be triggered and corresponds to the process variable, in order to use a technical framework platform to generate, on the display page, the trigger key corresponding to each triggerable label, where the triggerable label is provided with a name of the corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label.

Still further, the receiver 401 is further configured to receive next service data sent by the upstream service node; and the processor 402 is further configured to update, by using the IDE, the established egress branch according to the next service data and a process variable that is of the service node and corresponds to the next service data.

For example, the processor 402 is specifically configured to determine that an egress branch that is in the established egress branch and corresponds to the process variable that is of the service node and corresponds to the next service data is unchanged; delete, by using the IDE, an egress branch that is in the established egress branch and does not correspond to the process variable that is of the service node and corresponds to the next service data; establish, by using the IDE, an egress branch except the unchanged egress branch according to the next service data and the process variable that is of the service node and corresponds to the next service data.

Further, the processor 402 is further configured to delete all established egress branches, for example, configured to delete all the established egress branches by using the IDE.

The BPM-based service processing apparatus 40 in this embodiment may be configured to execute technical solutions in any method embodiment shown in FIG. 1 to FIG. 4, and implementation principles and technical effects thereof are similar, and details are not described herein again.

According to the BPM-based service processing apparatus provided in this embodiment of the present application, a service node receives service data sent by an upstream service node; establishes at least one egress branch according to the service data and a process variable that is of the service node and corresponds to the service data, where the process variable is used to indicate an attribute of a downstream service node; displays the at least one egress branch, so that a user selects an egress branch on a display page and initiates a trigger instruction on the display page; and determines the egress branch according to the received trigger instruction, and outputs the service data by using the egress branch. In this way, the service node can dynamically generate an egress branch when service data arrives, and no longer needs to recode and restart a set egress branch to implement an increase or a decrease of the egress branch. Therefore, the service node can provide in real time the received data with a required egress branch, thereby improving efficiency of an online process adjustment of service processing, and improving flexibility of the entire service processing.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A communications processing method comprising:
receiving, by a service node, service data sent by an upstream service node;
establishing, by the service node, at least one egress branch according to the service data and a process variable that is of the service node and corresponds to the service data, wherein the process variable is used to indicate an attribute of a downstream service node;
outputting, by the service node, the at least one egress branch to a display page, so that a user device selects an egress branch on the display page and initiates a trigger instruction, wherein the outputting the at least one egress branch to the display page comprises:
generating, by the service node, a triggerable label according to each egress branch that needs to be triggered and corresponds to the process variable, in order to use a technical framework platform to generate, on the display page, a trigger key corresponding to each triggerable label, wherein the triggerable label is provided with a name of the corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label; and determining, by the service node, the egress branch according to the trigger instruction, and outputting the service data by using the egress branch.

2. The method according to claim 1, wherein the establishing, by the service node, at least one egress branch according to the service data and a process variable that is of the service node and corresponds to the service data comprises:

determining, by the service node, a required processing rule according to a service attribute of the service data, wherein each processing rule corresponds to a unique process variable of the processing rule;

selecting, by the service node, a process variable that matches the processing rule from preset process variables, wherein the preset process variables are generated for the service node during modeling; and establishing, by the service node, the at least one egress branch according to the process variable.

3. The method according to claim 1, wherein the establishing, by the service node, at least one egress branch according to the service data and a process variable that is of the service node and corresponds to the service data comprises:

establishing, by the service node by using an integrated development environment (IDE), the at least one egress branch according to the service data and the process variable that is of the service node and corresponds to the service data; and the determining, by the service node, the egress branch according to the trigger instruction, and outputting the service data by using the egress branch comprises:

determining, by the service node, the egress branch according to the trigger instruction, and invoking the determined egress branch, in order to output the service data by using the egress branch.

4. The method according to claim 1, after the outputting the service data by using the egress branch, further comprising:

deleting, by the service node, all established egress branches by using an integrated development environment (IDE).

5. The method according to claim 1, after the outputting the service data by using the egress branch, further comprising:

receiving, by the service node, next service data sent by the upstream service node; and updating, by the service node by using an integrated development environment (IDE), the established egress branch according to the next service data and a process variable that is of the service node and corresponds to the next service data.

6. The method according to claim 5, wherein the updating, by the service node by using the IDE, the established egress branch according to the next service data and a process variable that is of the service node and corresponds to the next service data comprises:

determining, by the service node, that an egress branch that is in the established egress branches and corresponds to the process variable that is of the service node and corresponds to the next service data is unchanged;

deleting, by the service node by using the IDE, an egress branch that is in the established egress branch and does not correspond to the process variable that is of the service node and corresponds to the next service data; and establishing, by the service node by using the IDE, an egress branch except the unchanged egress branch according to the next service data and the process variable that is of the service node and corresponds to the next service data.

7. A communications processing apparatus comprising:

a processor; and a non-transitory computer-readable storage medium coupled to the processor and storing programming instructions for execution by the processor, the programming instructions instruct the processor to:

receive service data sent by an upstream service node;

establish at least one egress branch according to the service data and a process variable that is of the service node and corresponds to the service data, wherein the process variable is used to indicate an attribute of a downstream service node;

output the at least one egress branch to a display page, so that a user selects an egress branch on the display page and initiates a trigger instruction on the display page, generate a triggerable label according to each egress branch that needs to be triggered and corresponds to the process variable, in order to use a technical framework platform to generate, on the display page, a trigger key corresponding to each triggerable label, wherein the triggerable label is provided with a name of the corresponding trigger key, service content provided by the trigger key, and whether the trigger key needs to be triggered, so that the name of the trigger key, the service content provided by the trigger key, and whether the trigger key needs to be triggered are displayed, according to a preset pattern, for the trigger key corresponding to the triggerable label, and determine the egress branch according to the trigger instruction and output the service data by using the egress branch.

8. The apparatus according to claim 7, wherein the programming instructions further comprise instructions which, when executed by the processor, cause the processor to determine a required processing rule according to a service attribute of the service data, wherein each processing rule corresponds to a unique process variable of the processing rule; select a process variable that matches the processing rule from preset process variables, where in the preset process variables are generated for the service node during modeling; and establish the at least one egress branch according to the process variable.

9. The apparatus according to claim 7, wherein the programming instructions further comprise instructions which, when executed by the processor, cause the processor to:

establish the at least one egress branch according to the service data and the process variable that is of the service node and corresponds to the service data by using an integrated development environment (IDE); and determine the egress branch according to the trigger instruction, and invoke the determined egress branch, and output the service data by using the egress branch.

10. The apparatus according to claim 9, wherein the programming instructions further comprise instructions which, when executed by the processor, cause the processor to delete all established egress branches by using the IDE.

11. The apparatus according to claim 9, wherein the programming instructions further comprise instructions which, when executed by the processor, cause the processor to receive next service data sent by the upstream service node; and update the established egress branch according to the next service data and a process variable that is of the service node and corresponds to the next service data by using the IDE.

\* \* \* \* \*